(12) United States Patent
Louie et al.

(10) Patent No.: US 11,700,972 B2
(45) Date of Patent: Jul. 18, 2023

(54) TURBO FAN STEAM MILK FROTHER

(71) Applicant: SANDORA HOUSEHOLD ELECTRIC APPLIANCES (SHENZHEN) LTD., Shenzhen (CN)

(72) Inventors: Waihang Louie, Shenzhen (CN); Zhigang Zhu, Shenzhen (CN); Kwokwai Wong, Shenzhen (CN)

(73) Assignee: SANDORA HOUSEHOLD ELECTRIC APPLIANCES (SHENZHEN) LTD., Shenzhen (CN)

( * ) Notice: Subject to any disclaimer, the term of this patent is extended or adjusted under 35 U.S.C. 154(b) by 836 days.

(21) Appl. No.: 16/618,035

(22) PCT Filed: Dec. 21, 2018

(86) PCT No.: PCT/CN2018/122771
§ 371 (c)(1),
(2) Date: Nov. 27, 2019

(87) PCT Pub. No.: WO2019/192215
PCT Pub. Date: Oct. 10, 2019

(65) Prior Publication Data
US 2021/0274977 A1    Sep. 9, 2021

(30) Foreign Application Priority Data
Apr. 2, 2018  (CN) .......................... 201820454303.4

(51) Int. Cl.
*A47J 43/12*    (2006.01)
*A47J 31/44*    (2006.01)

(52) U.S. Cl.
CPC .......... *A47J 43/127* (2013.01); *A47J 31/4485* (2013.01); *A47J 31/4489* (2013.01)

(58) Field of Classification Search
CPC ... A47J 31/408; A47J 31/40; A47J 36/38; A47J 43/127; A47J 31/4485; A47J 31/4489
USPC ......... 99/279, 287, 289, 293, 300, 357, 452, 99/453, 454, 455, 470; 426/433, 432, 426/487, 488, 492, 569, 506, 590, 594, 426/587
See application file for complete search history.

(56) References Cited

U.S. PATENT DOCUMENTS

2008/0168907 A1* 7/2008 Shen .................. A47J 31/4485
99/294

FOREIGN PATENT DOCUMENTS

| CN | 107529912 A | 1/2018 |
| CN | 109222659 A | 1/2019 |
| EP | 3245916 A1 | 11/2017 |

OTHER PUBLICATIONS

The World Intellectual Property Organization (WIPO) International Search Report for PCT/CN2018/122771 dated Feb. 28, 2019 6 Pages.

* cited by examiner

*Primary Examiner* — Phuong T Nguyen
(74) *Attorney, Agent, or Firm* — Anova Law Group, PLLC (57) ABSTRACT

A fan-based steaming and foaming device is provided with a fan assembly and an activation device between a steam tube and an ejection tube. The invention employs an air pressure difference of a fan to directly inject, into a liquid, air required for foaming.

10 Claims, 13 Drawing Sheets

TURBO FAN STEAM MILK FROTHER

CROSS-REFERENCES TO RELATED APPLICATIONS

This application is a national stage application of PCT Patent Application No. PCT/CN2018/122771, filed on Dec. 21, 2018, which claims priority to Chinese Patent Application No. 201820454303.4, filed on Apr. 2, 2018, the content of all of which is incorporated herein by reference.

FIELD OF THE INVENTION

The present disclosure relates to a beverage preparation device, and more particularly to a turbo fan steam milk frother.

BACKGROUND

Following a higher and higher requirement to a taste of a food, people have proposed a requirement on a milk foam in a beverage, wherein forming a plurality of milk foams being small and dense will make a taste of the beverage more silky.

At present, in market, a steam foaming device is commonly used to foam a dairy product, but a traditional steam foaming device requires an operator to first stop a steam pipe at a surface of a liquid, making the liquid mix with air, before placing the steam pipe into the liquid and forming a vortex, until a liquid mixed with air achieving that a large milk foam is broken up into a plurality of small milk foams under an action of a shear stress. While an injection amount of the air is small, there is no way to form a plurality of milk foams being dense, thus no way to satisfy the requirement to the taste of a consumer. It is hard for an inexperienced person to operate, who needs a plurality of study and practices, before mastering a method and a technique for injecting the air. Also a foaming effect changes according to an experience and a feel of the person, thus affecting a stability of a quality of a product.

Therefore, the current technology needs to be improved and developed.

BRIEF SUMMARY OF THE DISCLOSURE

According to the above described defects in the prior art, the purpose of the present disclosure is providing a turbo fan steam milk frother, in order to solve a problem in the prior art that a steam foaming device is unable to get the air injected directly, causing an operation complex, and a foaming effect unstable.

A technical solution of the present disclosure to solve the technical problems is as follows:

A turbo fan steam milk frother, comprising:

a steam pipe, having one end applied to connecting to a steam preparation device;

a fan assembly, locating under the steam pipe, and connecting with the steam pipe;

a sparging pipe, arranged at a lower end of the fan assembly, and at an end of the sparging pipe, there is a sparging hole arranged.

The turbo fan steam milk frother, wherein the fan assembly comprises:

an outer shell, an upper end of the outer shell connects to the steam pipe, a lower end of the outer shell connects to the sparging pipe;

a fan frame, arranged in the outer shell;

a baffle, arranged inside the fan frame, applied to dividing the fan frame by the baffle into a steam chamber and an air chamber;

a first through hole, locating in the baffle;

a connection shaft, passing through the first through hole;

a driving fan, connecting to one end of the connection shaft, the driving fan locates inside the steam chamber, and under the steam pipe, applied to achieving that a steam sparged by the steam pipe drives the driving fan rotate;

a driven fan, connecting to another end of the connection shaft, the driven fan locates inside the air chamber, applied to achieving that the connection shaft drives the driven fan rotate when the driving fan rotates.

The turbo fan steam milk frother, wherein the fan frame comprises:

a steam passage, arranged on an upper end of the fan frame, the steam passage connects to the steam pipe;

a sparging passage, arranged on a lower end of the fan frame, the sparging passage connects to the sparging pipe;

The turbo fan steam milk frother, wherein the fan frame comprises:

a first fan cover, engaged with one side of the fan frame, the first fan cover locates outside of the driving fan, together with the baffle, to form the steam chamber;

a second fan cover, engaged with another side of the fan frame, the second fan cover locates outside of the driven fan, together with the baffle, to form the air chamber;

an air pipe, the air pipe is arranged on the second fan cover, applied to inducing an air outside.

The turbo fan steam milk frother, wherein comprising:

a first outer shell cover, engaged with one side of the outer shell;

a second outer shell cover, engaged with another side of the outer shell;

a second through hole, arranged on the second outer shell cover, the second through hole engages the air pipe.

The turbo fan steam milk frother, wherein the sparging pipe further comprises:

an air passage pipe, the air passage pipe connects to an air sparging passage;

a steam passage pipe, the steam passage pipe connects to an steam sparging passage.

The turbo fan steam milk frother, wherein comprising:

a mixing chamber, locating between the air passage pipe and the steam passage pipe, applied to mixing the air and the steam.

The turbo fan steam milk frother, wherein a tail end of the sparging pipe is bent to form a U shape.

The turbo fan steam milk frother described above, wherein comprising: a shell body, arranged to cover an outer side of the spraging pipe, the shell body is screwed to the sparging pipe.

The turbo fan steam milk frother, wherein comprising:

a shell body, arranged to cover an outer side of the spraging pipe, the shell body is screwed to the sparging pipe;

a nozzle shell, arranged outside the sparging pipe, a shape of the nozzle shell adapts to that of the sparging pipe.

All above, the present disclosure provides a turbo fan steam milk frother, between the steam pipe and the sparging pipe, there is a fan assembly arranged, when the device is started, through an air pressure difference of a fan, it is able to inject the air into the liquid directly, which is required for foaming. No more uncontrollable air injection by an operator is needed, even an inexperienced operator is able to operate, and an operation is simple, a plurality of milk foams prepared is small and dense, a taste of the beverage is delicate and a quality thereof is stable.

DETAILED DESCRIPTION OF EMBODIMENTS

The present disclosure provides a turbo fan steam milk frother, in order to make the purpose, technical solution and the advantages of the present disclosure clearer and more explicit, further detailed descriptions of the present disclosure are stated here, referencing to the attached drawings and some preferred embodiments of the present disclosure. It should be understood that the detailed embodiments of the disclosure described here are used to explain the present disclosure only, instead of limiting the present disclosure.

The present disclosure provides a turbo fan steam milk frother, shown as FIG. 1 to FIG. 4, the turbo fan steam milk frother comprises a steam pipe 100, a fan assembly 200, a sparging pipe 300 and a sparging hole 400. Shown as FIG. 1 and FIG. 4, one end of the steam pipe 100 connects to a steam preparation device (not shown in the FIGs), another end covers and connects to the fan assembly 200, a lower end of the fan assembly 200 connects to the sparging pipe 300, and at an end of the sparging pipe 300, there is the sparging hole 400 arranged.

Figure 1:
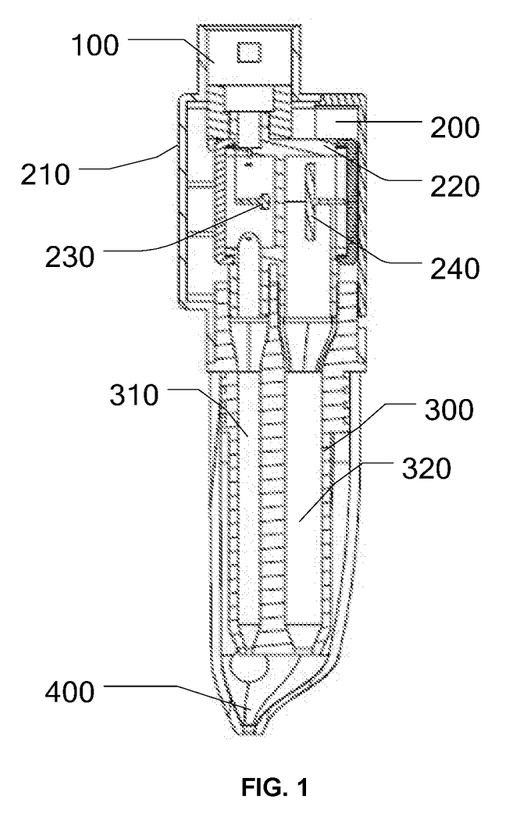
FIG. 1 illustrates a sectional diagram of a first turbo fan steam milk frother provided in the present disclosure.
Figure 2:
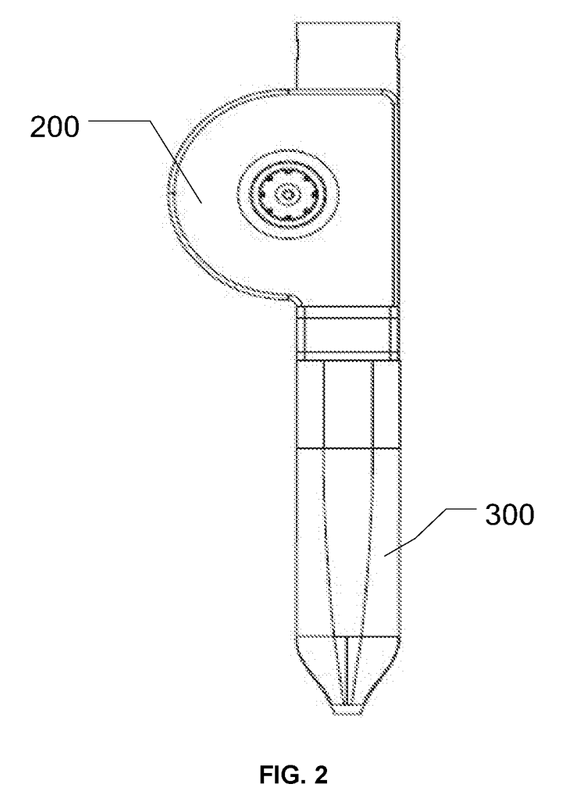
FIG. 2 illustrates a side view of the first turbo fan steam milk frother provided in the present disclosure.
Figure 3:
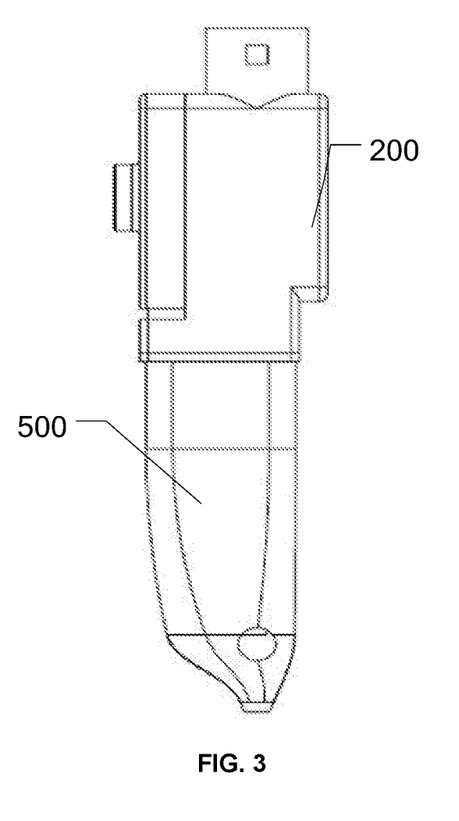
FIG. 3 illustrates another side view of the first turbo fan steam milk frother provided in the present disclosure.
Figure 4:
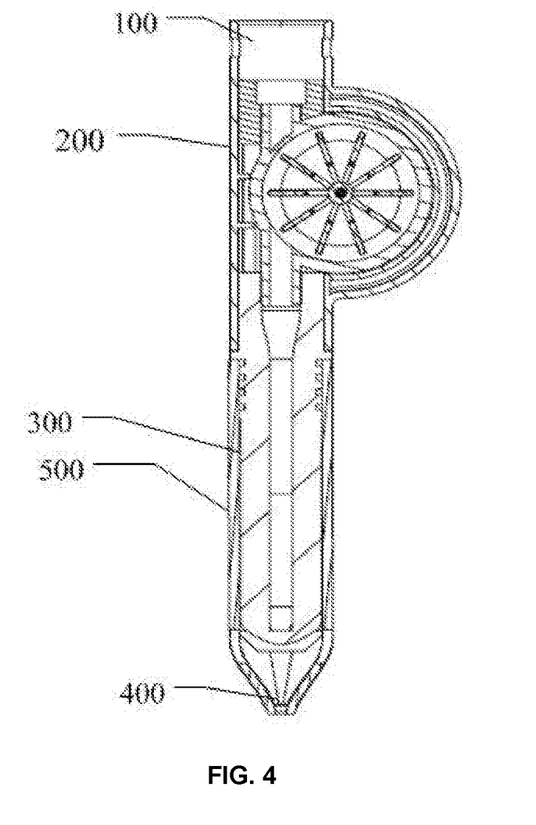
FIG. 4 illustrates another sectional diagram of the first turbo fan steam milk frother provided in the present disclosure.
Figure 5:
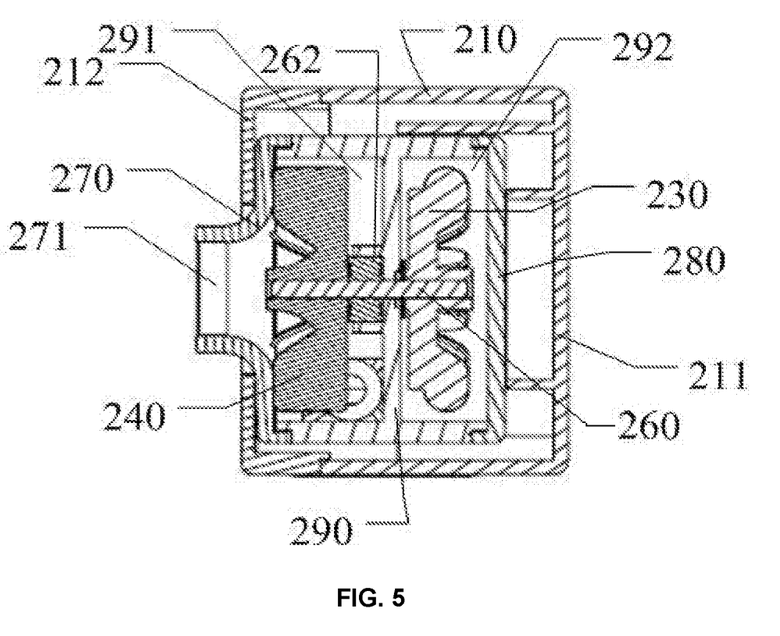
FIG. 5 illustrates a sectional diagram on a fan assembly of the first turbo fan steam milk frother provided in the present disclosure.
Figure 6:
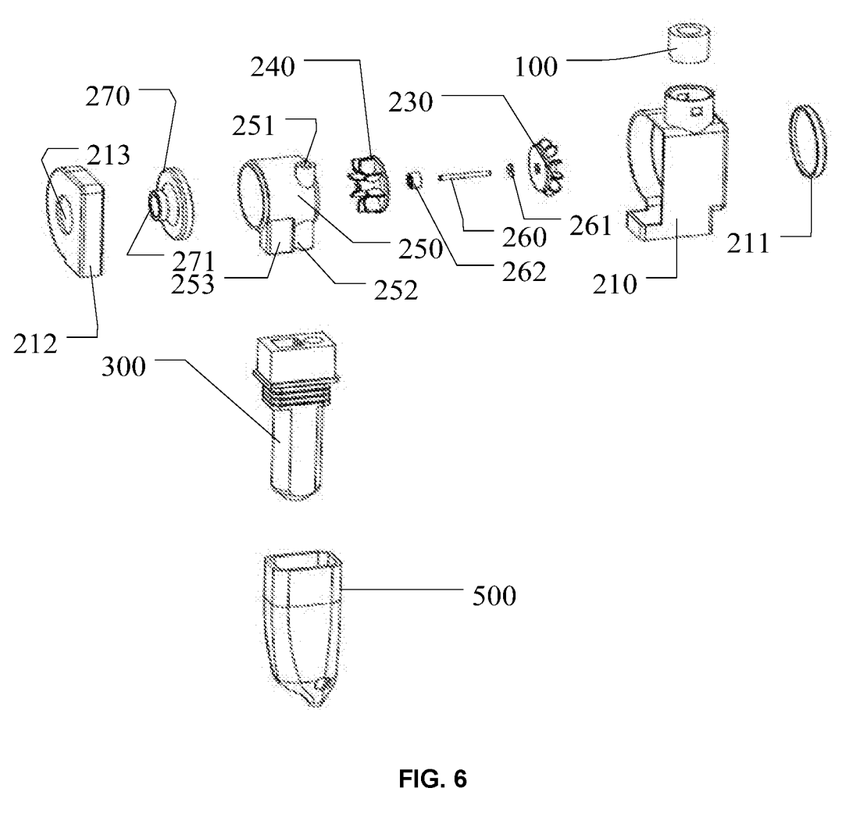
FIG. 6 illustrates another sectional diagram of the first turbo fan steam milk frother provided in the present disclosure.

Specifically, shown as FIG. 5 and FIG. 6, the fan assembly 200 comprises an outer shell 210, a fan frame 250, a driving fan 230 and a driven fan 240. An upper end of the outer shell 210 connects to the steam pipe 100, a lower end of the outer shell 210 connects to the sparging pipe 300, one side of the outer shell 210 has a first outer shell cover 211 arranged, while another side of the outer shell 210 has a second outer shell cover 212 arranged, and the second outer shell cover 212 has a second through hole 213 arranged.

The fan frame 250 is covered and arranged inside the outer shell 210, an upper end of the fan frame 250 has a steam passage 251 arranged, the steam passage 251 connects to the steam pipe 100, a lower end of the fan frame 250 has a sparging passage arranged, the sparging passage connects to the sparging pipe 300, the sparging passage comprises an air sparging passage 253 and a steam sparging passage 252, steam may enter inside the fan frame 250 through the steam passage 251, and enter the sparging pipe 300 through the steam sparging passage 252. Shown as FIG. 5 and FIG. 6, one side of the fan frame 250 engages a first fan cover 280, another side thereof engages a second fan cover 270, the second fan cover 270 has an air pipe 271 arranged on, the air pipe 271 is engaged in the second through hole 213, to facilitate air outside enter the fan frame 250.

Shown as FIG. 5 and FIG. 6, inside the fan frame 250, there is a baffle 290 arranged, the baffle 290 and the first fan cover 280 together forms a steam chamber 292, steam enters the steam chamber 292 through the steam passage 251. The baffle 290 and the second fan cover 270 together forms an air chamber 291, air enters the air chamber 291 through the air pipe 271.

The baffle 290 has a first through hole arranged in a middle, a connection shaft 260 is able to pass through the first through hole, one end of the connection shaft 260 located in the steam chamber 292 has the driving fan 230 connected, the driving fan 230 may connect to the connection shaft 260 through a bearing 262. The driving fan 230 is placed in the steam chamber 292, and located on a lower end of the steam passage 251. When the steam sprays out from the steam pipe 100, it will drive the driving fan 230 rotate. Preferably, the connection shaft 260 may have a sealing ring 261 covered and arranged, so as to be able to facilitate a sealing property of the steam chamber 292. Another end of the connection shaft 260 located in the air chamber 291 has the driven fan 240 connected, when the driving fan 230 rotates, the connection shaft 260 may be driven to rotate, so as to drive the driven fan 240 rotate, due to a pressure difference between inner and outer, the air outside will enter the air chamber 291 through the air pipe 271.

The sparging pipe 300 has two passages arranged inside, one is a steam passage pipe 310, applied to having the steam getting in, located at a lower end of the steam chamber 292, and connected to the steam sparging passage 252. Another is an air passage pipe 320, applied to having the air getting in, located at a lower end of the air chamber 291, and connected to the air sparging passage 253. Shown as FIG. 1, both gases may be sprayed directly to around the sparging hole 400 through a passage respectively, before entering the liquid, and the air forms a plurality of foams in the liquid, the steam drives the liquid rotate, crashing a large foam into small foams, while the small foams in a large amount and dense form a plurality of milk foams having a delicate taste.

Further, since the sparging pipe 300 is generally made of a silicone rubber or other materials, which is easy to get deformed, preferably, on an outer side of the sparging pipe 300, a shell body 500 is arranged, the shell body 500 is applied to protecting the sparging pipe 300, and avoiding a deformation of the sparging pipe 300. The shell body 500 may be screwed and connected to the sparging pipe 300.

The steam enters the steam chamber 292 which is sealed through the steam pipe 100, until a driving force of the steam drives the driving fan 230 rotate, so as to drive the driven fan 240 rotate, since there is a pressure difference inner and outer the air chamber 291, air may enter the air chamber 291 through the air pipe 271. Steam entered the steam chamber 292 enters the steam passage pipe 310 through the steam passage 251, while the air entered the air chamber 291 enters the air passage pipe 320 through the air sparging passage 253, before both gases are mixed around the sparging hole 400, and entered into the liquid together. Air injected in the liquid will form foams, and steam will drive the liquid and form an effective vortex, crashing a large foam into a plurality of small foams, before being applied into a plurality of dairy products, milk foams small and dense will be formed. Comparing to artificially injecting air in the prior art, the present disclosure has an easier operation, and is able to ensure a big amount of air is injected into the liquid, being able to form a big amount of foams.

Figure 7:
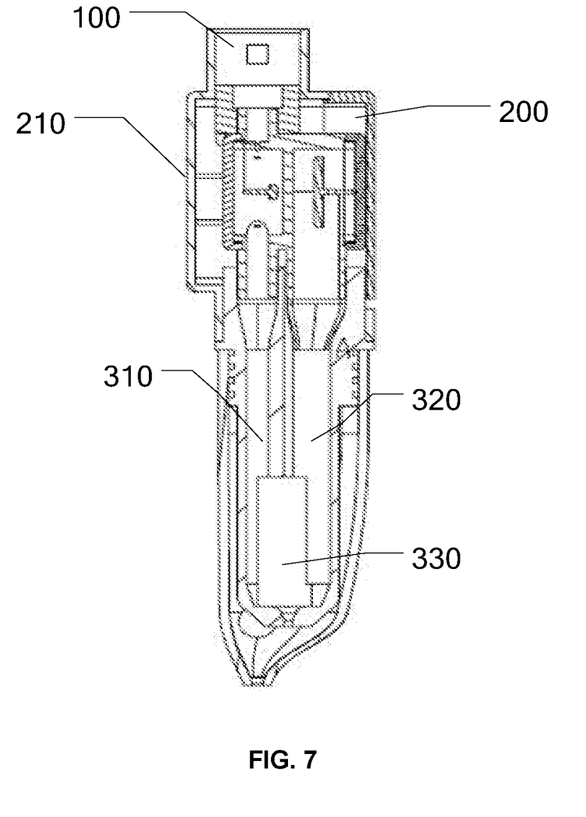
FIG. 7 illustrates a sectional diagram of a second turbo fan steam milk frother provided in the present disclosure.
Figure 8:
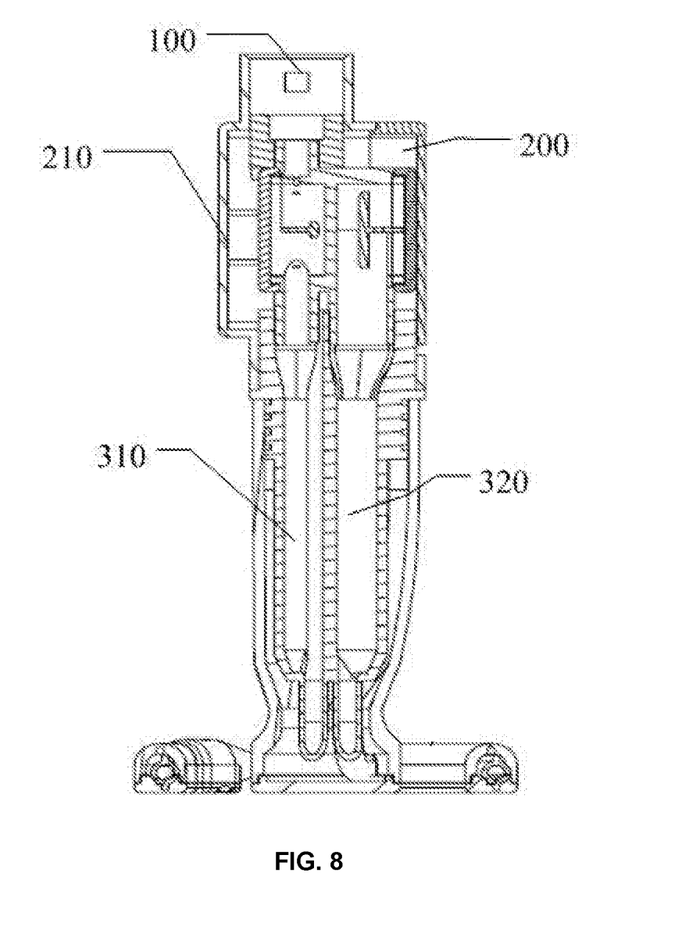
FIG. 8 illustrates a sectional diagram of a third turbo fan steam milk frother provided in the present disclosure.
Figure 9:
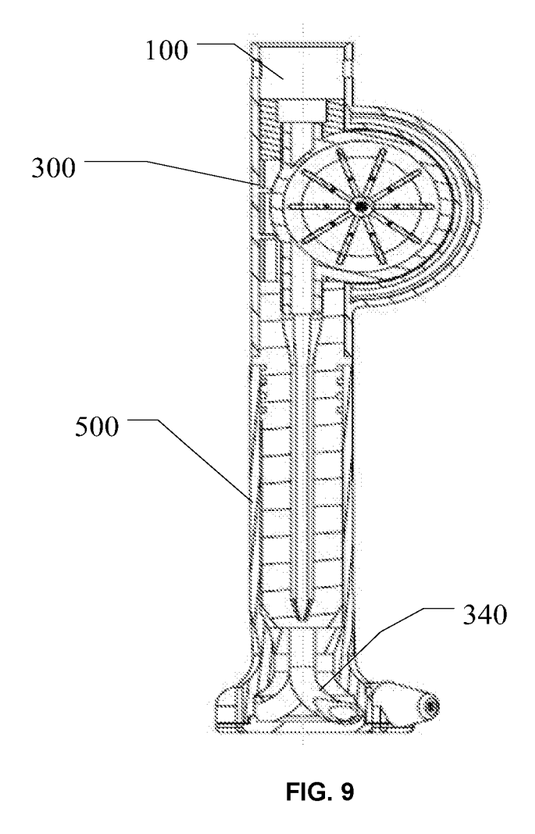
FIG. 9 illustrates a sectional diagram on a side of the second turbo fan steam milk frother provided in the present disclosure.
Figure 10:
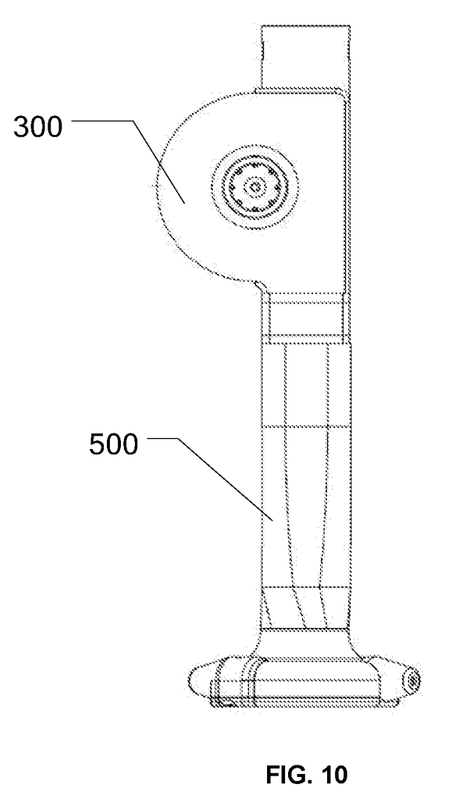
FIG. 10 illustrates a stereogram of the third turbo fan steam milk frother provided in the present disclosure.
Figure 11:
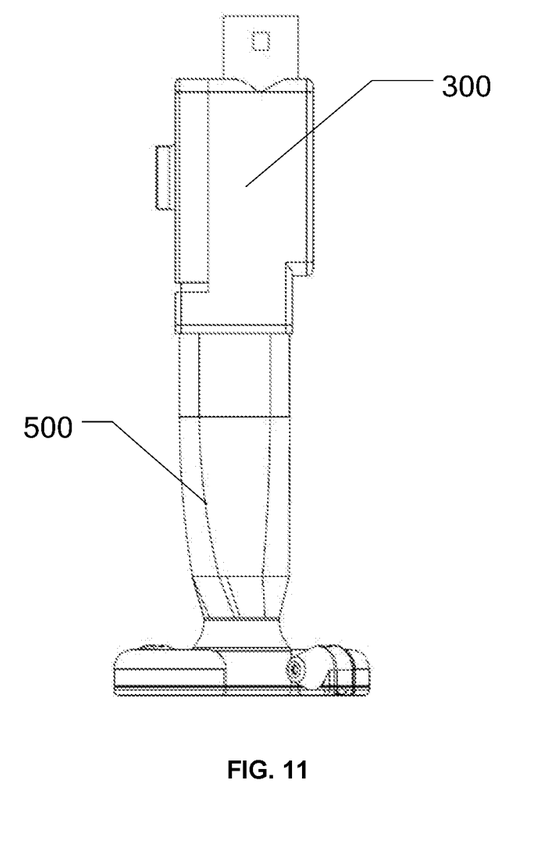
FIG. 11 illustrates another stereogram of the third turbo fan steam milk frother provided in the present disclosure.
Figure 12:
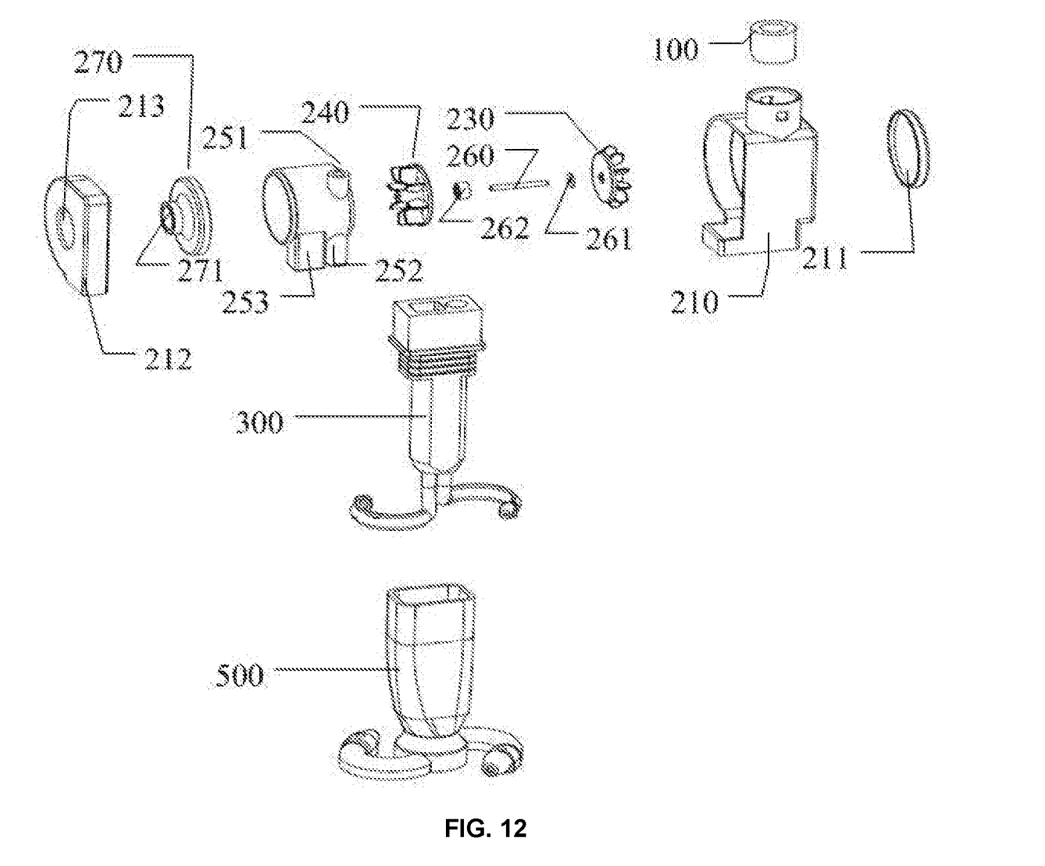
FIG. 12 illustrates an explored diagram of the third turbo fan steam milk frother provided in the present disclosure.

The present disclosure further provides a second embodiment, shown as FIG. 7, a difference to the first embodiment is, between the steam passage pipe 310 and the air passage pipe 320, there is a mixing chamber 330 arranged in a middle, the mixing chamber 330 connects to the steam passage pipe 310 and the air passage pipe 320, steam and air are mixed thoroughly in the mixing chamber 330, before being sprayed out of a nozzle. The mixing chamber 330 makes the steam and the air be able to mix thoroughly and equally. According to a principle in fluid mechanics, once a mixed gas is sprayed out of the nozzle, a plurality of milk foams are able to be formed fast on one hand, and on another hand, the liquid is able to form an effective vortex fast, crashing a large milk foam into a plurality of small milk foams, thus making a taste delicate.

The present disclosure further provides a third embodiment, shown as FIG. 8 to FIG. 12, a difference to the first embodiment is, in the present embodiment, a tail end of the sparging pipe 300 is U shaped, preferably, there are two U shapes arranged on the tail end, and two spray directions of the sparging hole 400 thereof are arranged in parallel but reverse, a U shaped design is able to increase a spray range and form a preset spray angle, thus forming an effective vortex. Presetting a spray angle, without requiring an operator to control and adjust a spray angle based on an experience, it is able to reduce a reliability to an experience of the operator.

Since the tail end of the sparging pipe 300 is U shaped, thus the tail end of the shell correspondingly is also arranged in U shaped, preferably, on an outer side of the spraging pipe 300, there is a nozzle shell (not shown in the FIGs) arranged, the nozzle shell adapts to a shape of the sparging pipe 300. In such a way, it may avoid a deformation of the sparging pipe 300, and better control a spray angle.

Figure 13:
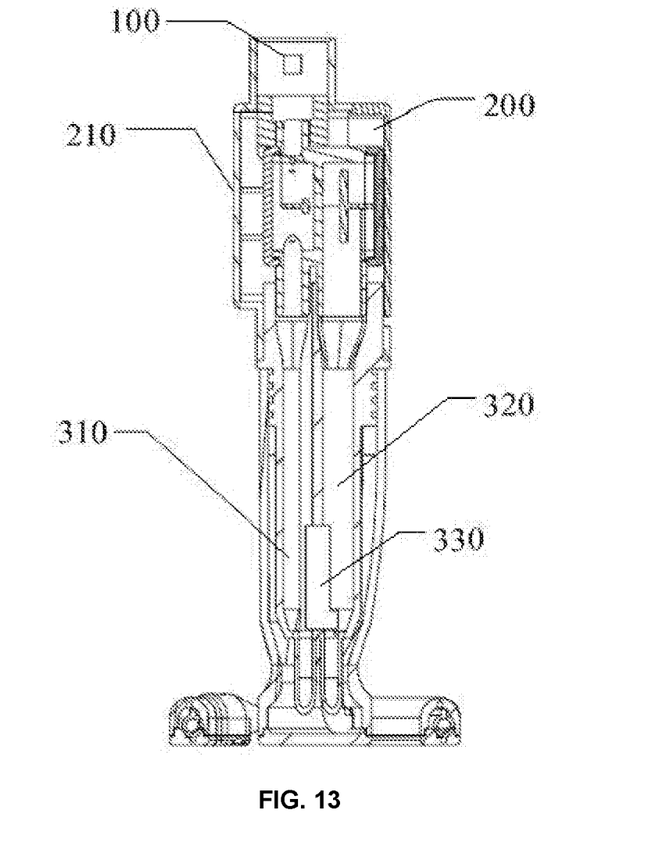
FIG. 13 illustrates a sectional diagram on a side of a fourth turbo fan steam milk frother provided in the present disclosure.

The present disclosure further provides a fourth embodiment, shown as FIG. 13, a difference to the third embodiment is, in the present embodiment, not only the tail end of the sparging pipe 300 is U shaped, but also the mixing chamber 330 is arranged. By adopting the mixing chamber 330 and the tail end of the sparging pipe 300 in an U shape, it is able to mix the gases well in advance, forming small and dense milk foams fast, without any artificial control of the spray angle required, thus lowering a requirement on experiences to the operator, in other words, the present embodiment is able to make an inexperienced operator prepare beverages having small and dense milk foams easily.

All above, the present disclosure provides a turbo fan steam milk frother, comparing to the prior arts, the turbo fan steam milk frother provided in the present disclosure has a simply operation, no extra air injection into the liquid artificially is required. Injecting air into the liquid directly, has ensured an air injection amount, while no experienced person is required to prepare a milk foam having a delicate taste, and a quality of a product is stable.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:
1. A turbo fan steam milk frother, comprising:
a steam pipe, having one end applied to connecting to a steam preparation device;
a fan assembly, locating under the steam pipe, and connecting with the steam pipe; and
a sparging pipe, arranged at a lower end of the fan assembly, and at an end of the sparging pipe, there is a sparging hole arranged,
wherein the fan assembly comprises:
an outer shell, an upper end of the outer shell connects to the steam pipe, a lower end of the outer shell connects to the sparging pipe;
a fan frame, arranged in the outer shell;
a baffle, arranged inside the fan frame, applied to dividing the fan frame by the baffle into a steam chamber and an air chamber;
a first through hole, locating in the baffle;
a connection shaft, passing through the first through hole;
a driving fan, connecting to one end of the connection shaft, the driving fan locates inside the steam chamber, and under the steam pipe, applied to achieving that a steam sparged by the steam pipe drives the driving fan rotate; and
a driven fan, connecting to another end of the connection shaft, the driven fan locates inside the air chamber, applied to achieving that the connection shaft drives the driven fan rotate when the driving fan rotates.

2. The turbo fan steam milk frother according to claim 1, wherein the fan frame comprises:
a steam passage, arranged on an upper end of the fan frame, the steam passage connects to the steam pipe; and
a sparging passage, arranged on a lower end of the fan frame, the sparging passage connects to the sparging pipe.

3. The turbo fan steam milk frother according to claim 2, wherein the fan frame comprises:
a first fan cover, engaged with one side of the fan frame, the first fan cover locates outside of the driving fan, together with the baffle, to form the steam chamber;
a second fan cover, engaged with another side of the fan frame, the second fan cover locates outside of the driven fan, together with the baffle, to form the air chamber; and
an air pipe, the air pipe is arranged on the second fan cover, applied to inducing an air outside.

4. The turbo fan steam milk frother according to claim 3, wherein comprising:
a first outer shell cover, engaged with one side of the outer shell;
a second outer shell cover, engaged with another side of the outer shell; and
a second through hole, arranged on the second outer shell cover, the second through hole engages the air pipe.

5. The turbo fan steam milk frother according to claim 4, wherein the sparging pipe further comprises:
an air passage pipe, the air passage pipe connects to an air sparging passage;
a steam passage pipe, the steam passage pipe connects to a steam sparging passage.

6. The turbo fan steam milk frother according to claim 5, wherein comprising:
- a mixing chamber, located between the air passage pipe and the steam passage pipe, applied to mixing the air and the steam.

7. The turbo fan steam milk frother according to claim 6, wherein the sparging pipe comprises: a tail end of the sparging pipe is bent to form a U shape.

8. The turbo fan steam milk frother according to claim 5, wherein comprising: a shell body, arranged to cover an outer side of the sparging pipe, the shell body is screwed to the sparging pipe.

9. The turbo fan steam milk frother according to claim 5, further comprising:
- a shell body, arranged to cover an outer side of the sparging pipe, the shell body is screwed to the sparging pipe; and
- a nozzle shell, arranged outside the sparging pipe, a shape of the nozzle shell adapts to that of the sparging pipe.

10. The turbo fan steam milk frother according to claim 5, wherein comprising: a shell body, arranged to cover an outer side of the sparging pipe, the shell body is screwed to the sparging pipe.

\* \* \* \* \*